(12) United States Patent
Gatton (10) Patent No.: US 7,243,584 B1
(45) Date of Patent: Jul. 17, 2007

(54) MASK FOR A WHEEL LATHE CHUCK THAT PREVENTS WHIP CHIP

(75) Inventor: Geoffrey L. Gatton, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 133 days.

(21) Appl. No.: 11/094,899

(22) Filed: Mar. 31, 2005

(51) Int. Cl.
*B23B 19/02* (2006.01)
(52) U.S. Cl. ............................... 82/142; 82/117; 82/112
(58) Field of Classification Search ................... 82/142, 82/11, 1.11, 117, 112, 168; 451/424; 279/157
See application file for complete search history.

(56) References Cited

U.S. PATENT DOCUMENTS

| | | | |
|---|---|---|---|
| 1,959,081 A | 5/1934 | Le Jeune | |
| 2,194,936 A | 3/1940 | Hatch | |
| 2,557,726 A | 6/1951 | Caswell | |
| 3,131,946 A | 5/1964 | Newhouser | |
| 3,323,808 A | 6/1967 | Newhouser | |
| 4,034,786 A | 7/1977 | Feldmann et al. | |
| 4,409,811 A | 10/1983 | Bosch | |
| 5,441,284 A | 8/1995 | Mueller et al. | |
| 5,464,233 A | 11/1995 | Hanai | |
| 5,562,007 A | 10/1996 | Seymour | |
| 5,820,137 A | 10/1998 | Patterson | |
| 6,126,174 A * | 10/2000 | Reece et al. | 279/2.24 |
| 6,481,281 B1 | 11/2002 | Gerdes | |
| 6,502,834 B1 | 1/2003 | Fukui et al. | |
| 6,862,785 B2 | 3/2005 | Baumgartner | |

* cited by examiner

*Primary Examiner*—Willmon Fridie, Jr.
(74) *Attorney, Agent, or Firm*—MacMillan, Sobanski & Todd LLC (57) ABSTRACT

A protective cover that is shaped as a mirror image of a portion of a wheel surface is attached to a support plate of a wheel lathe chuck assembly to protect the portion of the vehicle wheel surface during machining.

18 Claims, 8 Drawing Sheets

Fig.1

(Prior Art)

Fig. 2

(Prior Art)

MASK FOR A WHEEL LATHE CHUCK THAT PREVENTS WHIP CHIP

BACKGROUND OF THE INVENTION

This invention relates in general to wheel chuck assemblies.

Light weight alloy vehicle wheels are becoming increasingly popular. Such wheels typically include an annular wheel rim that carries a tire. A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub.

One conventional process for manufacturing light weight alloy wheels involves pouring molten metal into a wheel mold to form a casting of a one-piece wheel. After the molten metal solidifies, the wheel casting is removed from the mold. The wheel casting is oversized and is machined to a final shape. Alternately, a full face wheel disc that includes the outboard tire bead retaining flange is cast from a light weight alloy and machined to final shape. A partial wheel rim that can be rolled from a strip of steel is then welded to an inboard surface of the wheel disc to form a two piece wheel. Such a wheel combines the low cost and strength of a steel rim with a pleasing aesthetic appearance of a wheel disc cast from a light weight metal and is usually referred to as a bimetal wheel.

Machining the wheel or wheel disc casting typically includes multiple operations. Sawing machines cut any casting gates and risers from the casting. A drilling machine is used to drill the wheel mounting holes through the wheel hub. The wheel casting is then mounted upon a wheel lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. The central pilot hole is usually drilled while the casting is clamped in the lathe for turning the inboard tire bead seat.

Figure 1:
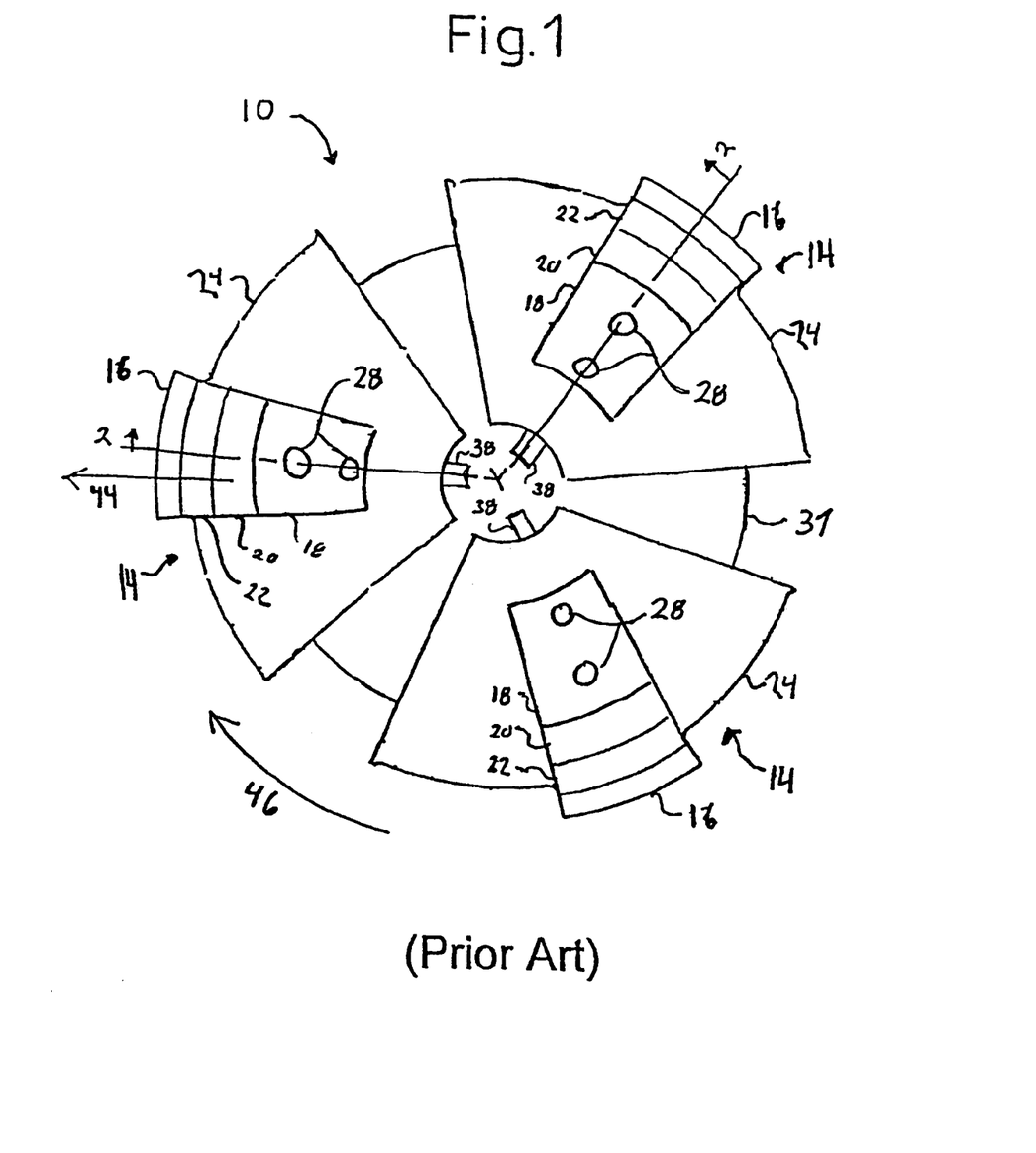
FIG. 1 is a front view of a known wheel chuck.
Figure 2:
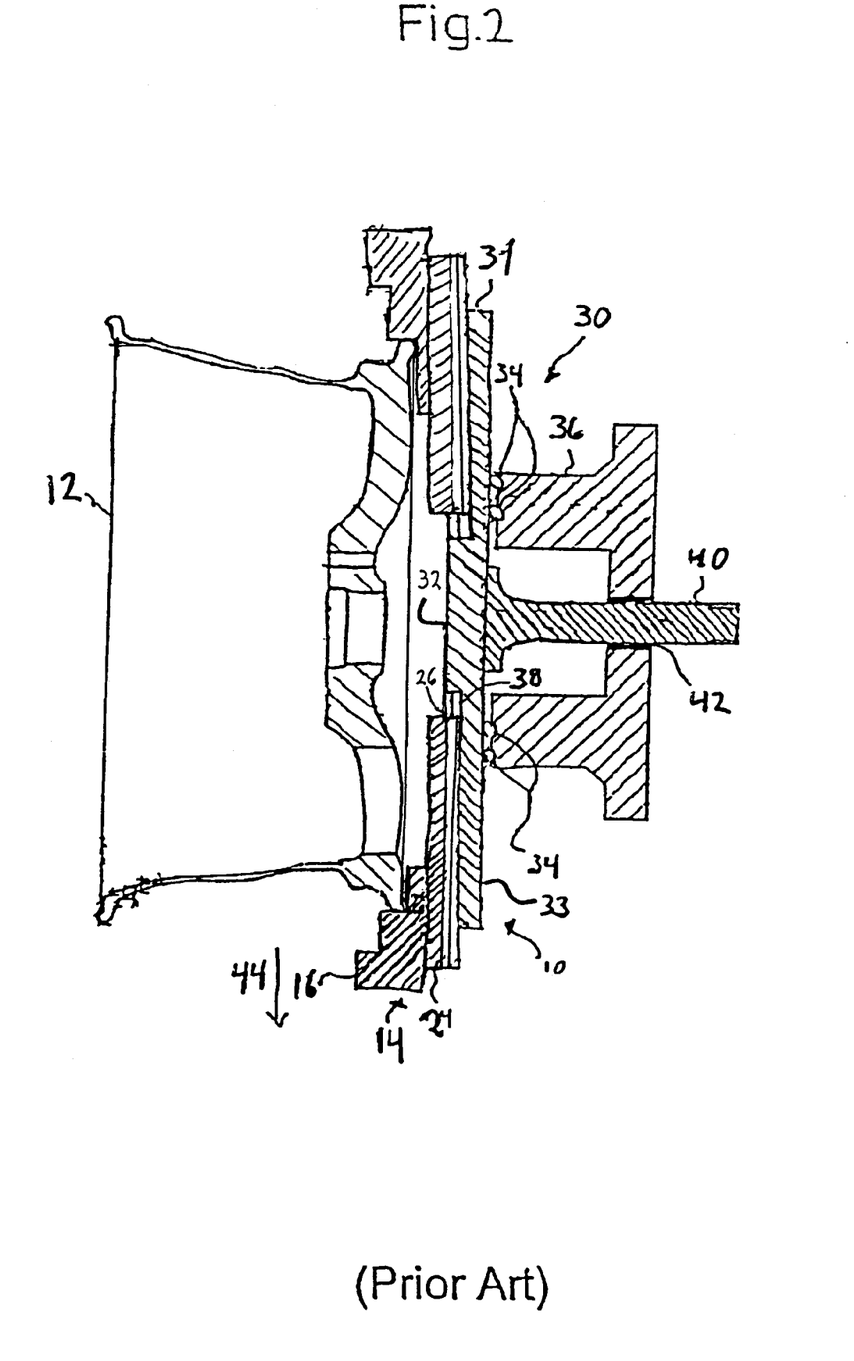
FIG. 2 is a sectional view of the known wheel chuck taken along the line 2—2 in FIG. 1.

Referring now to the drawings, there is shown generally at 10 in FIGS. 1 and 2 a prior art wheel lathe chuck. The known wheel lathe chuck 10 is suitable for clamping a wheel casting (not shown) or vehicle wheel 12 (as shown in FIG. 2) upon a wheel lathe (not shown). The chuck 10 includes a plurality of radially moveable jaws 14. While three jaws 14 are shown in FIG. 1, the chuck 10 also may have any suitable number of jaws. As best seen in FIG. 2, each jaw 14 includes a stepped portion 16 that includes a plurality of arcuate shaped clamping surfaces labeled 18, 20, and 22, having different radii. The stepped portion 16 is carried upon the upper surface of a wedge shaped actuator plate 24 and is attached thereto by threaded fasteners 28. Alternatively, the stepped portion 16 and the respective actuator plate 24 may be formed integrally as a one-piece jaw (not shown). A guide rib 26 extends from the lower surface of each actuator plate 24 in a radial direction from the center of the chuck 10. The guide rib 26 is typically formed having an inverted T cross sectional shape.

The actuator plates 24 are moveably mounted upon a support structure, indicated generally at 30 in FIG. 2. The support structure 30 includes a circular support plate 31 that is rotatably supported by bearings 34 upon a cylindrical riser 36. The support plate 31 has a first face 32 and a second face 33 that is adjacent to the riser 36. A plurality of radial slots 38 are formed in the first face 32 of the support plate 31 with each slot having an inverted T cross sectional shape that mirrors the cross sectional shape of the guide ribs 26. Each of the support plate slots 38 slidably receives a corresponding actuator plate guide rib 26 and cooperates with the guide rib 26 to retain the actuator plate 24 upon the support plate 31 while also guiding the radial movement of the actuator plate 24. The face place 32 is drivingly coupled to a rotatable lathe spindle 40 that passes through a central riser aperture 42 formed through the riser 36.

Prior to mounting the vehicle wheel 12 upon the chuck 10 for machining operations, at least one of the jaws 14 is moved in an outward radial direction, as generally indicated by the arrows labeled 44 in FIGS. 1 and 2, to an open position. The movement is accomplished by urging the corresponding guide rib 26 outward within its respective face plate slot 38 by a conventional hydraulic ram or a mechanical mechanism (not shown). Typically, all of the jaws 14 are simultaneously moved outward. Once the jaws 14 are opened, the wheel 12 is placed upon the step that corresponds to the wheel diameter, such as step 20. The chuck 10 can accommodate wheels of different diameters (not shown) that would be placed upon steps 18 and 22, respectively. The jaws 14 are then moved in a radial inward direction that is opposite to the arrows labeled 44 to clamp the wheel 12 upon the chuck 10.

The jaws 14, the actuator plates 24, and the conventional hydraulic ram or the mechanical mechanism operate as a clamping mechanism for the chuck 10. However, other chuck clamping mechanisms are also known, such as an arrangement of a yoke plate, guide pins, and locking arm (not shown).

During machining of the vehicle wheel 12, the lathe spindle 40 rotates the chuck 10 and the wheel 12, as indicated in FIG. 1 by an arrow labeled 46, while a tool (not shown) is pressed against a surface of the wheel. The tool cuts into the wheel surface to remove small pieces, or chips, of metal. Because of the rotation of the wheel 12 and the wheel chuck 10, the metal chips cut from the wheel 12 are thrown from the wheel and tend to strike the first face 32 of the support plate 31 and ricochet, or bounce back, toward the wheel. This action is often referred to as "chip whip." The ricocheting chips may strike, or hit, the face of the wheel 12 that is adjacent to the first face 32 of the support plate 31 and may damage or mar the wheel face surface. Typical damage from whip chip may include, for example, scratching painted wheel surfaces, blemishing or scuffing finished wheel surfaces, or generally nicking or marring the wheel surface. Thus, it would be desirable to provide a wheel chuck assembly that would reduce the possible damage caused by chips.

BRIEF SUMMARY OF THE INVENTION

This invention relates in general to wheel chuck assemblies and in particular to a wheel chuck assembly that includes a protective cover for a wheel face.

The present invention contemplates a wheel chuck assembly including a support plate adapted to be attached to a wheel lathe spindle. A clamping mechanism that is operable to releasably clamp a vehicle wheel is carried by the support plate. A wheel face cover is removably attached to the support plate. The wheel face cover has a shape that is a mirror image of at least a portion of a wheel face such that the cover protects the portion of the wheel face during machining.

The present invention also contemplates a method for machining a vehicle wheel that includes providing a cover having a shape that is formed as a mirror image of at least a portion of a vehicle wheel surface. The cover is mounted upon a wheel lathe chuck and a wheel is then mounted upon the wheel lathe with the cover extending over a portion of a surface of the wheel. The wheel is then machined with the cover protecting the wheel surface from metal chips removed during the machining operation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring again to the drawings, there is illustrated, in FIGS. 3 through 6, a wheel chuck assembly 60 in accordance with a first embodiment of the present invention. Components shown in FIGS. 3 through 6 that are similar to components shown in FIGS. 1 and 2 are labeled with the same numerical identifiers. The chuck assembly 60 includes a support plate 62 that is similar to the prior art support plate 31, except as described below. The support plate 62 is mounted upon the lathe spindle 40 in a manner that is similar to the mounting of the support plate 31, as described above. The support plate 62 includes a plurality of threaded bores 64 spaced between the slots 38, the purpose of which will be described below.

The chuck assembly 60 also includes a disc shaped protective cover 66. The cover 66 is preferably circular in shape and covers at least a portion of the face of the wheel 12 when the wheel is mounted upon the chuck assembly. In the preferred embodiment, the cover 66 has a diameter that is larger than the face of the wheel 12, i.e., the cover 66 is preferably large enough to more than cover the entire face of the vehicle wheel 12. Further, the cover 66 is preferably shaped to complement the shape of at least a portion of the face surface of the wheel 12. Therefore, a portion of the cover 66 mirrors the contour of at least a portion of the wheel face surface and covers that portion of the wheel face, as generally indicated at 67 in FIG. 4, such that the mirrored portion of the wheel face surface is protected during machining. In the preferred embodiment, the cover 66 both covers and contacts the mirrored portion of the wheel face.

In the preferred embodiment, the cover 66 conforms to the full face of the wheel 12, i.e. fully follows the contours of the entire face of the wheel 12. As shown, the cover 66 is formed such as to fully duplicate the contours of the face surface of the wheel 12. Thus, the cover 66 fully engages the surface of the face of the wheel 12 when the wheel 12 is mounted upon the wheel chuck assembly 60 and is in direct contact with the entire face surface of the wheel 12 to protect the wheel face surface during machining. Additionally, the cover 66 includes optional cover openings 69 that correspond to the vehicle wheel apertures, such as the pilot hole, wheel mounting holes, the wheel disc windows that are between wheel spokes, or any other wheel aperture, to allow access to the wheel apertures during machining. It will be understood, however, that the invention may be practiced with the cover 66 having any shape such that the cover 66 protects at least a portion of the surface of the vehicle wheel face during machining. Preferably, the cover 66 is formed from a plastic material and even more preferably a high density plastic material. It must be understood, however, that the cover 66 may be made of any suitable material or materials such as, for example, metal, wood, rubber, an elastometer or any other suitable material.

Figure 3:
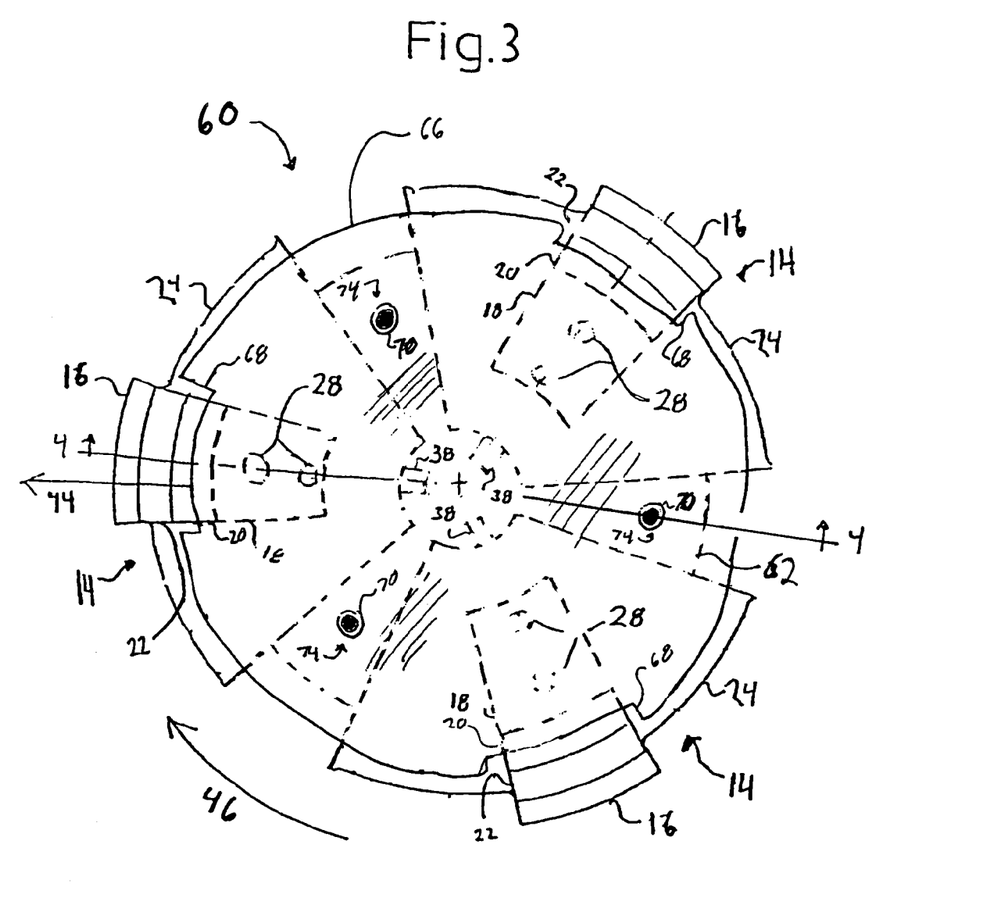
FIG. 3 is a front view of a wheel chuck assembly in accordance with the present invention.
Figure 4:
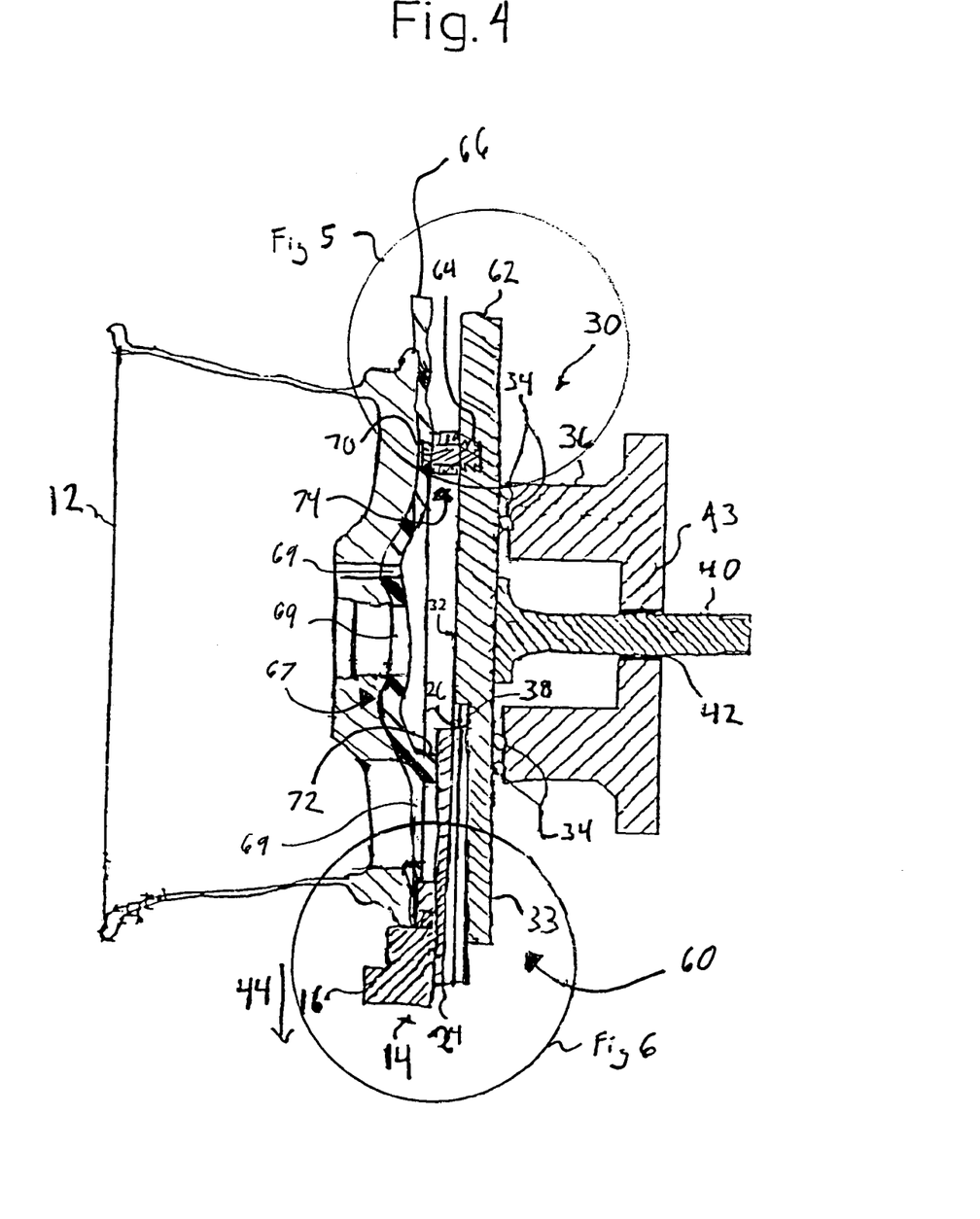
FIG. 4 is a sectional view of the wheel chuck assembly taken along the line 4—4 in FIG. 3.
Figure 6:
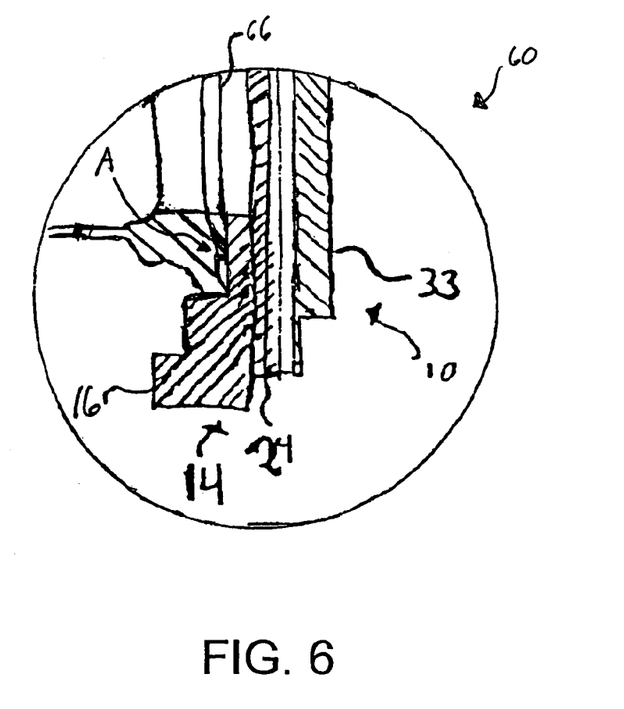
FIG. 6 is an enlarged sectional view of a second portion of the wheel chuck assembly of FIG. 4.
Figure 6B:
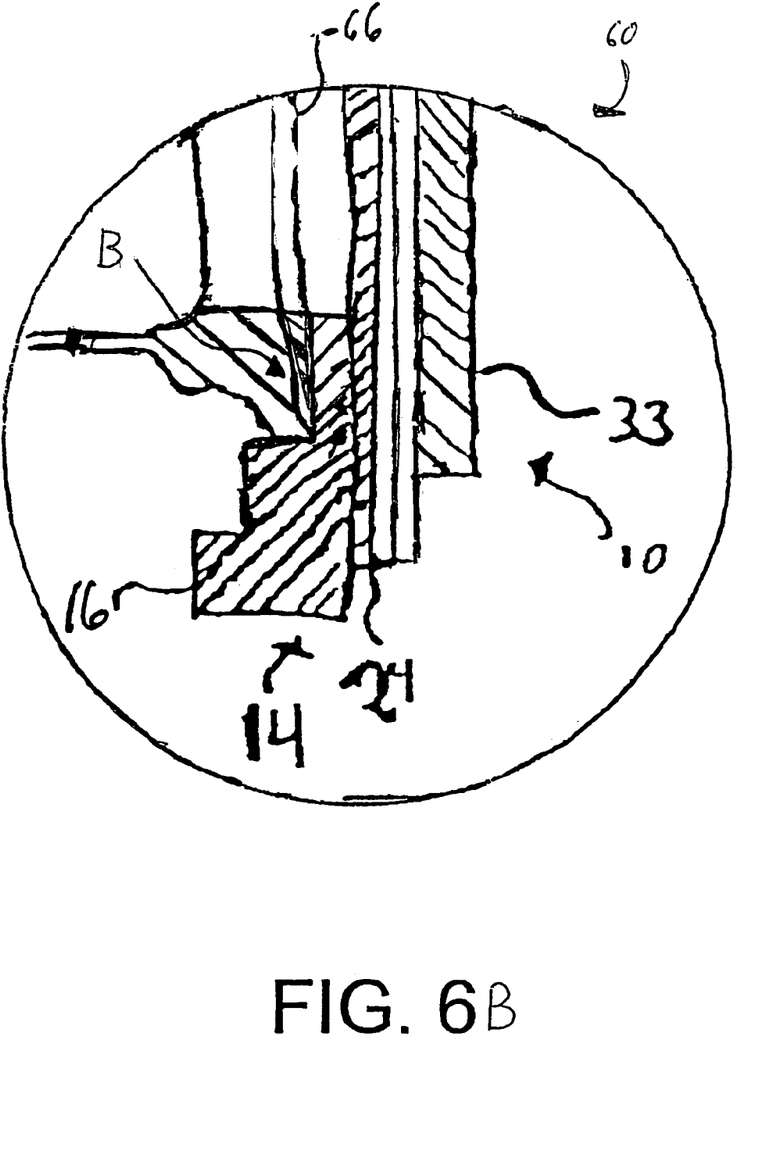
FIG. 6B is an enlarged sectional view similar to FIG. 6 of a portion of a wheel chuck assembly in accordance with an alternate embodiment of the present invention.

As best seen in FIG. 3, the cover 66 includes a plurality of notches 68 extending in an inward radial direction from the outer edge of the cover 66. The notches 68 are spaced equally about the circumference of the cover 66 with each notch 68 corresponding to one of the chuck jaws 14. Thus, when the cover 66 is positioned upon the chuck 10 each notch 68 receives a corresponding chuck jaw 14. The notches 68 are preferably pseudo-trapezoidal in shape, e.g. a truncated pie shape. The cover 66 and the jaws 14 are arranged such that the jaws 14 are able to move freely under normal operation, while the cover 66 still protects the face surface of the vehicle wheel 12 up to the inner edge of the jaws 14. As shown in FIG. 4, the cover 66 is extends over one of the steps 18, 20, and 22 that corresponds to the diameter of the wheel 12 to machined. Thus, the notches 68 are suitably deep, as compared to the corresponding step 18, 20, or 22, to allow for free inward movement of the jaws 14. Similarly, the width of the notches 68 is selected to receive the jaws 14 when the jaws are closed. Thus, in FIG. 3, the notches appear to be wider than the jaws; however, the jaws are shown in an open position and the gap between the side edge of each notch is eliminated when the jaws are closed upon a wheel. As shown in FIG. 6, the cover 66 and the jaws 14 form a sliding engagement at the notches 68 such that the cover 66 extends between the wheel 12 and the jaws 14, as indicated at A. As shown in FIG. 6, the base of the cover notch ends before reaching the edge of the wheel; however, the portion of the cover 66 at the base of each notch 68 forms a seal between the wheel face and the jaws, preventing wheel chips from reaching the portion of the wheel that extends beyond the base of the notch. In an alternate embodiment of the invention, shown in FIG. 6B, the cover 66 has tapered edges at the jaw interfaces to extend further between the wheel and jaws as indicated at "B".

As again best seen in FIG. 3, a plurality of countersunk bores 70 are formed through the cover that are aligned with the threaded bores 64 formed in the support plate 62. In the preferred embodiment, the bores 70 and the support plate bores 64 are equally spaced about bolt circles having the same diameter. In the preferred embodiment, the cover 66 also includes a plurality of supporting ribs 72 (one shown in FIG. 4) that extend from the surface of the cover adjacent to the support plate 62. In the preferred embodiment, the supporting ribs 72 are arcuate in shape, are disposed between the center of the cover 66 and the edge of the cover 66, and extend circumferentially about the cover 66. However, the invention also may be practiced with ribs having other shapes. Alternately, a plurality of studs (not shown) or posts (not shown) may be utilized in place of ribs. The supporting ribs 72 provide clearance between the cover and the support plated 62 for movement of the jaws 14. The ribs 72 also function to axially offset the cover 66 from the support plate 62 such that the cover contacts the surface of the wheel face. Thus, configuration, shape, and/or height of the supporting ribs 72 may vary as a function of the recessed depth of the wheel disc within the wheel rim and the wheel diameter.

Figure 5:
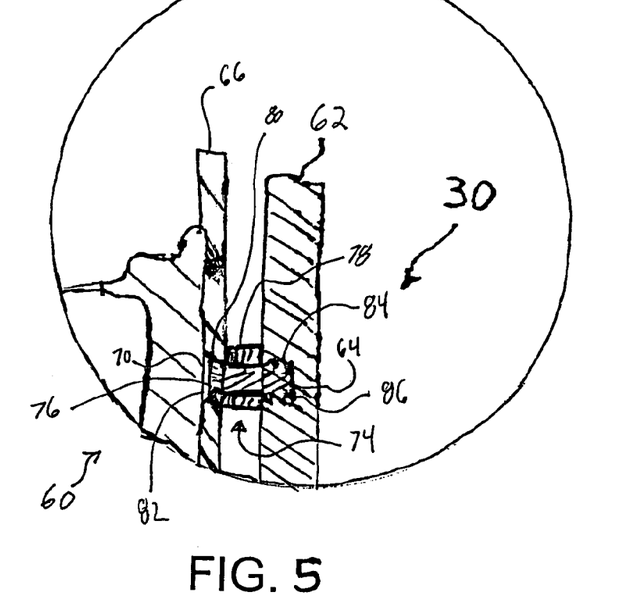
FIG. 5 is an enlarged sectional view of a first portion of the wheel chuck assembly of FIG. 4.

The chuck assembly 60 also includes a plurality of fastener assemblies 74 that secure the cover 66 to the support plate 62. As best seen in FIG. 5, the fastener assemblies 74 include a machine screw 76 and a cylindrical spacer 78, with the spacers 78 supporting the cover 66 upon the support plate 62. The screw 76 is preferably a flat headed machine screw with a tapered head 80 at a first end 82 for engaging the tapered countersunk bore 70 through the cover 66. The screw 76 also has a plurality of threads 84 at a second end 86 for engaging the threaded bores 64 formed in the support plate 62. The screw 76 threadably engages the support plate 62 so that the fastener assembly 74, and thus the cover 66, is removable and may be interchanged with different covers (not shown) that correspond to different wheel face shapes and/or diameters (not shown). The spacer 78 is preferably made of a resilient material, such as an elastomer, to cushion the wheel 12 and cover 60 when the wheel is mounted upon the chuck assembly. The fastener assemblies 74 are sized to provide a flush mounting of the cover 66 upon the support plate 62 with the cover 66 engages the surface of the wheel face. Thus, the length of the bolt 76 and the height of the spacer 78 are chosen such that the particular screw head is flush with the cover 66 and the cover is flush against the wheel face during machining and the cover 66 is axially offset from the support plate to accommodate movement of the jaws 14 and the height of the supporting ribs 72.

In operation, the cover 66 is installed on the chuck assembly 60 to protect the wheel 12 during machining. As described above, the cover 66 is formed to complement the shape and dimensions of a particular wheel 12 to prevent "chip whip" damage to the particular wheel face during machining. Thus, when the wheel 12 is mounted upon the chuck assembly 60, the cover 66 covers at least a portion of the face surface of the wheel 12. In the preferred embodiment, the cover 66 covers the entire wheel face surface. During machining, any metal chip that may ricochet off the support plate 62 and damage the face surface of the wheel 12, is deflected by the cover 66 and prevented form striking the wheel face. The cover 66 thus protects the wheel face surface during machining by blocking chips from reaching and then marring the wheel face surface.

Figure 7:
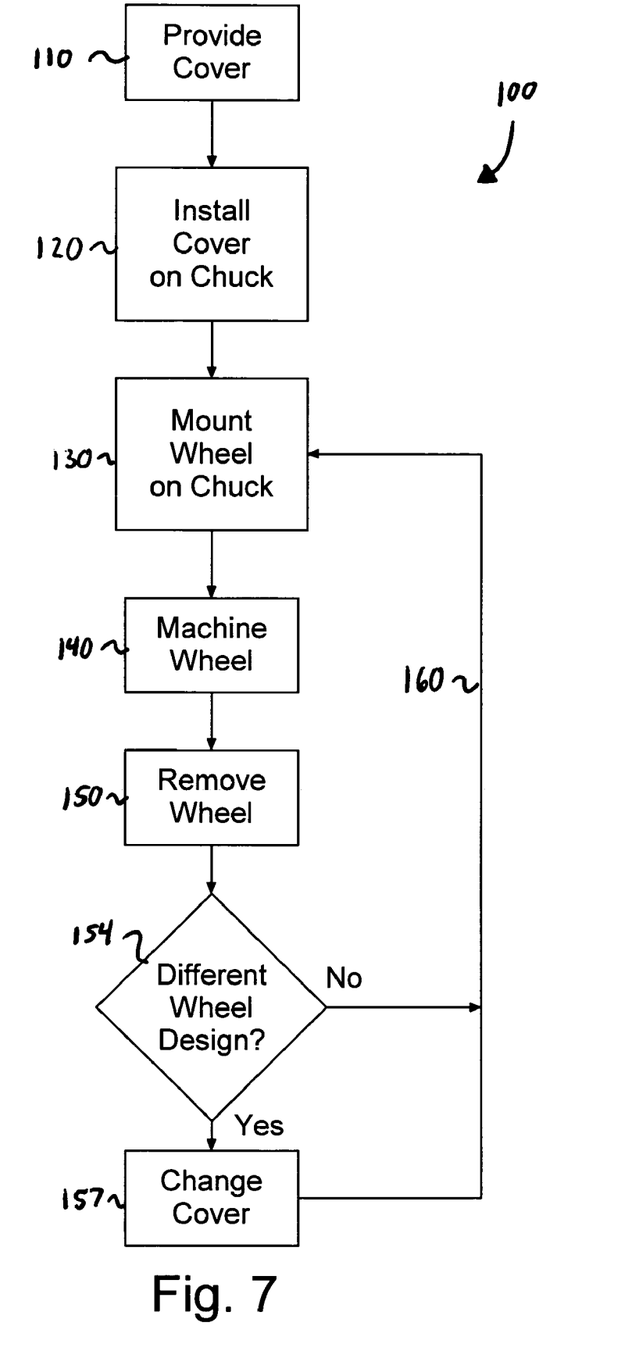
FIG. 7 is a flow chart illustrating a method for machining a vehicle wheel that utilizes the wheel chuck assembly shown in FIGS. 3–6.

The present invention also contemplates a method 100 for machining a vehicle wheel that is illustrated by the flow chart shown in FIG. 7. The method 100 begins in functional block 110 with provision of a cover having a shape that is complementary to the shape of a wheel face such that the cover mirrors the wheel surface shape and protects at least a portion of a vehicle wheel surface during machining. In the preferred embodiment, the cover protects the entire wheel face surface. One cover, for example, may be the cover 66 described above. The method 100 then proceeds to functional block 120 where the cover is installed on a wheel lathe chuck assembly that includes a clamping mechanism suitable to hold a wheel for machining. One chuck assembly, for example, may be the chuck assembly 60 described above. In the preferred embodiment, the wheel chuck assembly is part of a Computer Numerical Control (CNC) machining station. The method 100 then proceeds to functional block 130 where a wheel is mounted upon the chuck assembly for machining, with the wheel face adjacent to the cover such that the cover protects at least a portion of the wheel face surface during machining. The method 100 then proceeds to functional block 140 where the wheel is machined. In functional block 150 the wheel is removed from the chuck assembly.

The present invention further contemplates continuing the machining operation for multiple wheels. Thus, after removing the first wheel in functional block 150, the method 100 proceeds to decision block 154 where it is determined if a second wheel is of a different wheel design. If the second wheel is not of a different design, the method 100 returns directly to block 130, as indicated by the line labeled 160, where a second wheel is mounted on the wheel chuck assembly and the method 100 continues as described above. If, in decision block 154, the second wheel is of a different design the method 100 proceeds to functional block 157 where the cover provided in functional block 110 is changed for a second cover corresponding to the design of the second wheel. The method 100 then returns to the functional block 130 where the second wheel is mounted and the method 100 continues as described above.

Figure 8:
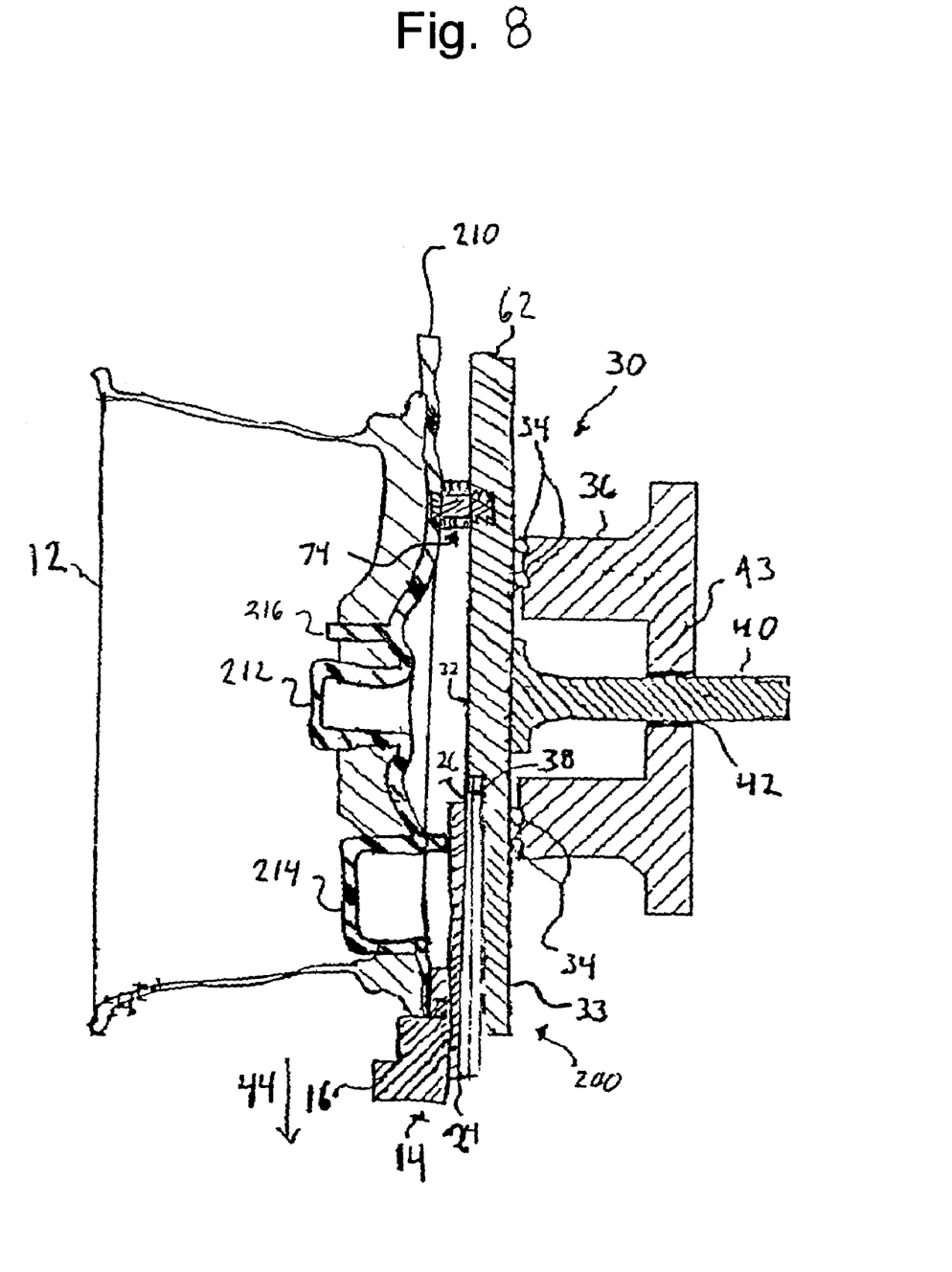
FIG. 8 is a sectional view of an alternate embodiment of the wheel chuck assembly shown in FIG. 3.

A wheel chuck assembly 200 in accordance with a second embodiment of the present invention is illustrated in FIG. 8. Components shown in FIG. 8 that are similar to components shown in FIGS. 3–6 are labeled with the same numerical identifiers. The chuck assembly 200 includes a cover 210 that is shaped to have a complementary shape to at least a portion of a surface of the vehicle wheel 12. As shown, the cover 210 is formed such as to duplicate the contour of the entire face surface of the wheel 12, similar to the cover 66 described above. However, the cover 210 also includes a plurality of plugs that extend into the apertures of the wheel 12. As shown in FIG. 8, a first plug 212 extends into the pilot hole of the wheel 12. A plurality of second plugs 214 (one shown) extend into windows of the wheel 12. A plurality of third plugs 216 (one shown) extend into the lug bolt holes of the wheel 12. The cover 210 is thus fitted to the particular wheel shape to include all of the apertures and openings formed through the wheel disc and thus prevents chips from passing into the wheel face openings during machining and marring the openings. The cover 210 also provides protection to the portion of the wheel face surface that is adjacent to the wheel face openings.

While the alternate embodiment has been illustrated and described as having plugs extending into all of the apertures formed through the wheel disc, it will be appreciated that the invention also may be practiced with only selected apertures plugged. For example, only the pilot hole plug 212 may be provided (not shown). Alternately, only the windows between the wheel spokes or the lug bolt holes may be plugged. Additionally, any selected combination of openings less than all openings may be plugged, such as, for example, the pilot and lug bolt holes but not the windows.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheel chuck assembly comprising:
   a support plate adapted to be attached to a wheel lathe spindle;
   a clamping mechanism carried by said support plate, said clamping mechanism operable to releasably clamp a vehicle wheel; and
   a substantially disc shaped protective cover removably attached to said support plate opposite the wheel lathe spindle, said cover having a shape formed as a mirror image of at least a portion of a wheel surface of a wheel to be machined upon the wheel chuck assembly such that said cover is adapted to contact said portion of said wheel surface to provide protection to said portion of said wheel surface during machining of the wheel.

2. The wheel chuck assembly of claim 1 wherein said cover shape is complementary to contours of said portion of said vehicle wheel surface.

3. The wheel chuck assembly of claim 1 wherein said cover is sized to protect an entire wheel face surface of said vehicle wheel.

4. The wheel chuck assembly of claim 2 wherein said clamping mechanism includes at least one stepped moveable jaw and further wherein said cover has at least one notch extending in an inward radial direction from an outer edge of said cover, said notch suitable to accept said stepped movable jaw.

5. The wheel chuck assembly of claim 4 wherein said cover is formed from a plastic material.

6. The wheel chuck assembly of claim 4 wherein said cover includes at least one plug extending from a surface of said cover and adapted to extend into a wheel aperture.

7. The wheel chuck assembly of claim 4 further including at least one fastener assembly, said fastener assembly removably securing said cover to said support plate.

8. The wheel chuck assembly of claim 7 wherein said cover includes at least one aperture formed therethrough and said support plate includes at least one threaded bore formed therein and aligned with said cover aperture and further wherein said fastener assembly includes at least one threaded fastener extending through said cover aperture and having a head at a first end for engaging said cover and a plurality of threads at a second end that are received by said support plate bore.

9. The wheel chuck assembly of claim 8 wherein said fastener assembly includes at least one spacer between said cover and said support plate with said fastener extending through said spacer, said spacer operative to axially offset said cover from said support plate.

10. The wheel chuck assembly of claim 9 wherein said fastener head is tapered and said cover aperture is countersunk such that said fastener head is flush with a surface of said cover.

11. The wheel chuck assembly of claim 7 including at least one support rib extending from a surface of said cover, said rib axially offsetting said cover from said support plate.

12. The wheel chuck assembly of claim 11 wherein said support rib has an accurate shape.

13. A method for machining a vehicle wheel, the method comprising:
    (a) providing a cover having a shape that mirrors at least a portion of a vehicle wheel surface during machining;
    (b) mounting the cover on a wheel lathe chuck;
    (c) mounting a wheel on the wheel lathe chuck adjacent to the cover with the cover extending over a portion of a wheel surface; and
    (d) machining the wheel with the cover providing protection to the portion of the wheel surface mirrored by the cover.

14. The method according to claim 13 further including, subsequent to step (d), removing the wheel from the wheel lathe chuck.

15. The method according to claim 14 wherein the wheel is a first wheel and wherein the method further includes, subsequent to removing the first wheel, mounting a second wheel on the wheel chuck and machining the second wheel.

16. The method according to claim 15 wherein the wheel is a first wheel and further wherein the method includes replacing the cover on the wheel lathe chuck with a second cover when the second wheel has a surface shape that is different from the surface shape of the first wheel, the second cover having a shape that mirrors the surface shape of at least a portion of the second wheel.

17. The method according to claim 14 wherein the cover provided in step (a) has a shape that is complementary to the contours of the portion of the vehicle wheel surface.

18. The method according to claim 17 wherein the cover is sized to protect the entire vehicle wheel face surface.

* * * * *